(12) United States Patent
Yenney et al.

(10) Patent No.: US 7,800,534 B1
(45) Date of Patent: Sep. 21, 2010

(54) SYSTEM AND METHOD FOR DETERMINING WHETHER TO ALLOW A BASE STATION TO PERFORM A PARTICULAR BASE STATION FUNCTION

(75) Inventors: Christopher Yenney, Ashburn, VA (US); Ryan S. Talley, Overland Park, KS (US); Timothy W. Sill, Platte City, MO (US); Bryan T. Barbee, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 304 days.

(21) Appl. No.: 12/021,325

(22) Filed: Jan. 29, 2008

(51) Int. Cl.
*G01S 19/21* (2010.01)
*G01S 19/16* (2010.01)

(52) U.S. Cl. .............................. 342/357.59; 342/357.54

(58) Field of Classification Search ............ 342/357.02, 342/357.09, 357.1, 357.15, 357.17; 455/456.1, 455/456.4
See application file for complete search history.

(56) References Cited

U.S. PATENT DOCUMENTS

| | | | |
|---|---|---|---|
| 5,621,793 A * | 4/1997 | Bednarek et al. | ............. 380/240 |
| 5,745,523 A | 4/1998 | Dent et al. | |
| 5,909,381 A | 6/1999 | Shome et al. | |
| 5,995,042 A * | 11/1999 | Durboraw et al. | ...... 342/357.02 |
| 6,088,589 A | 7/2000 | Valentine et al. | |
| 6,198,432 B1 | 3/2001 | Janky | |
| 6,985,731 B1 | 1/2006 | Johnson et al. | |
| 7,250,903 B1 * | 7/2007 | McDowell | ............. 342/357.02 |
| 2005/0144647 A1 | 6/2005 | Zussman et al. | |
| 2006/0083199 A1 | 4/2006 | Yang | |
| 2006/0116127 A1 | 6/2006 | Wilhoite et al. | |
| 2006/0121916 A1 | 6/2006 | Aborn et al. | |
| 2006/0128384 A1 | 6/2006 | Jagadeesan et al. | |
| 2006/0217112 A1 | 9/2006 | Mo | |
| 2007/0047516 A1 | 3/2007 | Kottilingal | |
| 2007/0097983 A1 | 5/2007 | Nylander et al. | |
| 2007/0105527 A1 | 5/2007 | Nylander et al. | |
| 2007/0156804 A1 | 7/2007 | Mo | |
| 2007/0183427 A1 | 8/2007 | Nylander et al. | |
| 2008/0088507 A1 * | 4/2008 | Smith et al. | .................. 342/464 |

(Continued)

OTHER PUBLICATIONS

Samsung Telecommunications Systems, Products & Solution—Mobile, CDMA UbiCell, downloaded from the World Wide Web on Aug. 22, 2007.

(Continued)

*Primary Examiner*—Thomas H Tarcza
*Assistant Examiner*—Fred H Mull (57) ABSTRACT

A method and system for determining whether to allow a base station to carry out at least one particular base station function and for configuring the system, based on the determination, to allow the base station to carry out the at least one particular base station function or to prevent the base station from carrying out the at least one particular base station function. The determination may be carried out at the base station or at a base station controller (BSC). The determination may be based, at least in part, on whether data provided to the BSC from the base station comprises spoofed GPS data. Configuring the system may include setting at the base station or at the BSC at least one parameter to either allow the base station to carry out the base station function(s) or to prevent the base station from carrying out the base station function(s).

20 Claims, 4 Drawing Sheets

U.S. PATENT DOCUMENTS

2009/0059822 A1   3/2009   Morrill et al.
2009/0129263 A1*  5/2009   Osborn ..................... 370/230

OTHER PUBLICATIONS

Trimble Navigation Limited, Samsung Selects Trimble's GPS Timing Solution for Its Ubicell System, downloaded from the World Wide Web on Aug. 22, 2007.
WIKIPEDIA, Femtocell, downloaded from the World Wide Web on Aug. 22, 2007.
Eric Zeman, Ubi, I Be, We Be Screaming for Samsung's UbiCell Femtocell, Information Week.com, Mar. 30, 2007.
PR Newswire, Samsung Telecommunications America, LLC, Samsung Introduces CDMA Base Station for Home Coverage at CTIA Wireless 2007, Mar. 26, 2007.
Engage Communication, Cellular Backhaul Over IP/Ethernet, downloaded from the World Wide Web on Sep. 28, 2007.
Nortel, This is the Way, BSC and TCU 3000 Cost-Efficiently Address GSM Densification and Evulution Market Needs, May 9, 2005.
Sprint, Sprint Airave, Quick Start Guide, downloaded from the World Wide Web on Sep. 21, 2007.
Sprint Nextel, Sprint Airave User Guide, downloaded from the World Wide Web on Sep. 21, 2007.
Paula Bernier, Home Base, Virgo Publishing, May 30, 2007, downloaded from the World Wide Web on Aug. 22, 2007.
Chris Ziegler, ENGADGET.COM, Hands-on with Samsung Ubicell, Mar. 28, 2007, downloaded from the World Wide Web on Aug. 22, 2007.
Brad Kellett, MOBILEBURN.COM, Samsung Launches the UbiCell from CTIA, Apr. 5, 2007.
Rupert Baines, VP Marketing, picoChip Flexible Wireless, The Need for WiMAX picocell & Femtocells, Mar. 5, 2007.
Sprint Nextel, Sprint Airave—Experience Life at Sprintspeed, downloaded from the World Wide Web at http://airave.sprint.com/index.html on Sep. 21, 2007.
U.S. Appl. No. 11/936,583, entitled system and method for preventing or allowing occurrence of a base station function, filed Nov. 7, 2007.
Jon S. Warner et al., GPS Spoofing Countermeasures, Dec. 2003.
Hengqing Wen et al. Countermeasures for GPS signal spoofing, downloaded from the World Wide Web at http://129.15.114.75/download/ION/Wen_Spoof.doc on Oct. 29, 2007.
Pillsbury Winthrop Shaw Pittman LLP, FCC Announces Schedule for Advanced Wireless Services Spectrum Auction, Apr. 2006.
ST Microelectronics, STB5600—GPS RF Front-end IC, Aug. 1998.
ST Microelectronics, ST20-GP6—GPS Processor, Oct. 2004.
Dana M. Sommer, Principles of GPS, Mar. 24, 2005.

* cited by examiner

SYSTEM AND METHOD FOR DETERMINING WHETHER TO ALLOW A BASE STATION TO PERFORM A PARTICULAR BASE STATION FUNCTION

BACKGROUND

1. Cellular Wireless Networks

Many people use wireless communication devices, such as cell phones and personal digital assistants (PDAs), to communicate with cellular wireless networks. These wireless communication devices and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), and/or any others.

These networks typically provide services such as voice, Short Message Service (SMS) messaging, and packet-data communication, among others, and typically include a plurality of base stations, each of which provide one or more coverage areas, such as cells and sectors. When a wireless communication device is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro base stations," and the network they collectively form—or to which they collectively belong—is referred to generally and herein as the "macro network."

Wireless communication devices and macro base stations conduct communication sessions (e.g. voice calls and data sessions) over a frequency known as a carrier, which may actually be a pair of frequencies, with the base station transmitting to the wireless communication device on one of the frequencies, and the wireless communication device transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one carrier. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a wireless communication device—that is on a given sector/carrier—to use a particular traffic channel for a communication session, the macro base station does so by instructing the wireless communication device to tune to one of the 61 traffic channels on that sector/carrier. It is over that assigned traffic channel that the macro base station will transmit forward-link data to the wireless communication device during the ensuing communication session. And, in addition to that forward-link channel, the traffic channel also includes a corresponding Walsh-coded reverse-link channel, over which the wireless communication device transmits data to the macro base station.

2. Low-Cost Internet Base Stations (LCIBs)

Many macro-network subscribers, including private consumers and small businesses, among others, in addition to having wireless service (which may include data service) for their wireless communication device(s), also have high-speed (a.k.a. "broadband") Internet access through another communication channel. This other channel may be cable-modem service, digital-subscriber-line (DSL) service, satellite-based Internet service, and/or some other option. In an exemplary arrangement, a user may have a cable modem connected (i) via coaxial cable to the cable provider's network and (ii) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. poor in-building coverage) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), ubicells, microcells (micro base stations, micro BTSs), and perhaps by other names. Note that the aforementioned terms that end in "cell" may also be generally and herein used interchangeably with the coverage area provided by the respective devices.

A typical LCIB may be approximately the size of a desktop phone or WiFi access point, and is essentially a low-power, low-capacity, low-cost version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service provider's core network, and thereby be able to securely communicate with the VPN terminator and other entities on that core network and beyond.

The LCIB also has a wireless-communication (e.g. CDMA) interface that is compatible with the user's wireless communication device(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that wireless communication devices can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

OVERVIEW

The present invention is directed to making a determination of whether a device, such as a base station, is allowed to carry out at least one particular function. In one respect, an exemplary embodiment of the present invention is arranged as a method comprising: (i) receiving into a base station controller from a base station, a set of data, (ii) at the base station controller, making a first determination of whether the set of data comprises spoofed global positioning system (GPS) data, and (iii) making a second determination of whether to allow the base station to carry out at least one particular base station function, wherein the making the second determination is based at least in part on the first determination.

In another respect, an exemplary embodiment of the present invention is arranged as a system comprising: (i) a communications interface that receives a set of data from a remote device, (ii) a processor, and (iii) data storage containing computer-readable program instructions executable by the processor. The program instructions comprise instructions that cause the processor to make a first determination of whether the set of data comprises spoofed GPS data, and to make a second determination of whether to allow the remote device to carry out at least one particular function, wherein the second determination is based at least in part on the first determination.

In yet another respect, an exemplary embodiment of the present invention is arranged as a device comprising: (i) a GPS receiver to receive a set of data, (ii) a communications interface to transmit the first set of data to a remote apparatus that makes a first determination of whether the set of data comprises spoofed GPS data, and to receive from the remote apparatus a message including data that indicates whether the device is allowed to carry out at least one particular function, (iii) a processor, and (iv) data storage containing at least one parameter settable to indicate whether the device is allowed to carry out the at least one particular function, and computer-readable program instructions executable by the processor. In accordance with this embodiment, the remote apparatus uses the first determination to make a second determination of whether the device is allowed to carry out the at least one particular function, and the program instructions include instructions to set the at least one parameter in accordance with the received data that indicates whether the device is allowed to carry out at least one particular function.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

Reference numerals are shown in the drawings to identify various elements of the drawings. Drawing elements having identical reference numerals are substantially identical or identical elements.

DETAILED DESCRIPTION

1. Introduction

The present invention provides a system and method for determining whether to allow a device, such as a base station of a radio access network (RAN), to carry out at least one particular function and for configuring the system, based on the determination, to allow the device to carry out the particular function(s) or to prevent the device from carrying out the particular function(s). For purposes of this description, this determination is referred to herein as the "device operability determination" or the "base station operability determination."

The device operability determination may be based on one or more determinations, such as a determination of whether a set of data received from the device comprises spoofed global positioning system (GPS) data. If the received set of data comprises spoofed GPS data, then the device operability determination indicates that the device is not allowed to carry out the particular function(s), whereas if the received set of data does not comprise spoofed GPS data, then the device operability determination indicates that the device is allowed to carry out the particular function(s).

In accordance with an exemplary embodiment in which the device comprises a base station, the particular function(s) may comprise any of a variety of base station functions. As an example, in general, the base station function(s) may comprise a function that prevents a user from using the base station. As another example, in particular, the base station function(s) may comprise a function such as: (i) transmitting a forward link carrier for reception by a wireless communication device, (ii) transmitting a pilot beacon for reception by the wireless communication device, (iii) allowing a wireless communication device to establish a virtual private network (VPN) data session with a remote entity, (iv) allowing the wireless communication device to maintain a VPN data session established with a remote entity, (v) allowing the wireless communication device to establish a point-to-point protocol (PPP) data session with a remote entity, (vi) allowing the wireless communication device to establish a voice call with a remote phone, (vii) sending to the base station controller a message that causes the base station controller to send to a home location register (HLR) database a message for updating information associated with the wireless communication device, (viii) sending to the base station controller a message that causes the base station controller to send to a visitor location register (VLR) database a message for updating information associated with the wireless communication device, (ix) prompting a user of the base station to cycle power to the base station, and (x) notifying a user of the base station that reception quality of GPS signals is below a threshold level for GPS signal reception.

2. Exemplary Architecture

Figure 1:
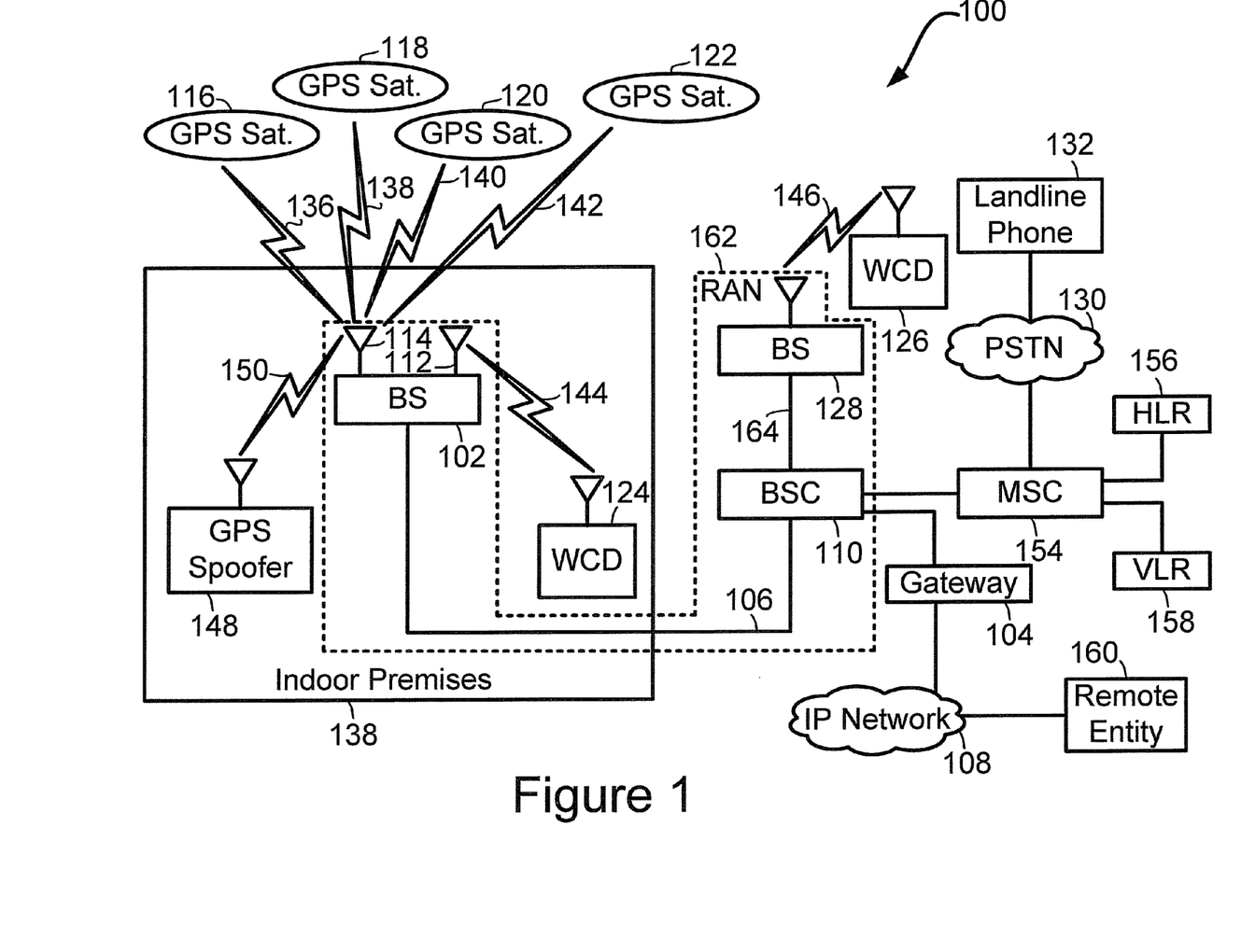
FIG. 1 is a block diagram of a system in which an exemplary embodiment may be implemented.

FIG. 1 is a block diagram of a system 100 in accordance with an exemplary embodiment of the present invention. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

The system 100 comprises a radio access network (RAN) 162 including base stations 102, 128, a base station controller (BSC) 110, a communication link 106 for carrying out communications between the base station 102 and the BSC 110, and a communication link 164 for carrying out communications between the base station 128 and the BSC 110. The RAN 162 may comprise one or more other base stations, one or more other base station controllers, and other communication links to carry out communications between the other base stations and base station controllers.

The base station 102 and/or the BSC 110 may be operable to prevent the base station 102 from carrying out the particular base station function(s) and/or to allow the base station 102 to carry out the particular base station function(s). Similarly, the base station 128 and/or the BSC 110 may be operable to prevent the base station 128 from carrying out the particular base station function(s) and/or to allow the base station 128 to carry out the particular base station function(s).

The base stations 102, 128 may each be arranged in any of a variety of configurations. In an exemplary embodiment of the invention, the base station 102 is arranged as a femto cell base station, such as a CDMA Ubicell™ base station or a Sprint Airave™ base station manufactured by the Samsung Group, Seoul, South Korea, and the base station 128 is arranged as a macro cell base station, such as a CDMA Metro Cell base transceiver station (BTS) manufactured by Nortel Networks Corporation, Toronto, Ontario, Canada. Alternatively, base station 128 may arranged similar to the base station 102. Other exemplary arrangements of the base stations 102, 128 are also possible.

The base station 102 may comprise a communications antenna 112 operable to communicate signals to and/or receive signals from one or more wireless communication devices via an air interface 144. For example, the base station 102 may communicate signals to and/or receive signals from a wireless communication device 124 via the antenna 112 and the air interface 144. The air interface 144 may carry out communications according to an air interface protocol, such as CDMA (e.g., 1xRTT, 1xEV-DO), iDEN, TDMA, AMPS, GSM, GPRS, UMTS, EDGE, WiMAX (e.g., IEEE 802.16), 3GPP LTE, MMDS, Wi-Fi (e.g., IEEE 802.11), Bluetooth, and others now known or later developed.

The base station 102 may comprise a GPS antenna 114 operable to receive signals transmitted directly from one or more GPS satellites, such as GPS satellites of the NAVSTAR global positioning system developed by the United States Department of Defense (referred to hereinafter as "the GPS system"). By way of example, FIG. 1 depicts that the GPS antenna 114 receives GPS signals 136, 138, 140, 142, from GPS satellites 116, 118, 120, 122, respectively. By way of another example, the GPS antenna 114 may receive GPS signals from a quantity of GPS satellites that is greater than or less than four GPS satellites (e.g., zero, one, or five satellites).

Alternatively, or additionally, the GPS antenna 114 may receive GPS signals indirectly (e.g., from a GPS signal repeater), rather than directly from a GPS satellite. A GPS signal repeater (not shown) may be used in an embodiment of the invention in which the base station 102 is located at an area where the GPS signals 136, 138, 140, 142 cannot be received by the GPS antenna 114. This area may be within an indoor premises 138, such as a house, an apartment building, an office building, a factory, a hospital, or some other type of indoor premises.

The GPS antenna 114 may also be operable to receive a data signal 150 that comprises spoofed GPS data (e.g., simulated GPS data). The spoofed GPS data may include data elements similar to data elements contained in authentic GPS data (e.g., GPS data transmitted from the GPS satellites 116, 118, 120, 122). For example, these data elements may include a time-of-day, a GPS week number, satellite health information, satellite identifier information, ephemeris data, and almanac data. The GPS antenna 114 may receive the data signal 150 from a GPS spoofer 148. The GPS spoofer 148 may be used within the indoor premises 138, such as at an area where the GPS antenna 114 can receive the data signal 150, but is unable to receive the GPS signals 136, 138, 140, 142.

Typically, the GPS spoofer 148 is not as sophisticated as the GPS system. As an example, the lack of sophistication may result from the GPS spoofer 148 using a clock that is not as accurate as atomic clocks used in the GPS system. Use of a less accurate clock may be detected by comparing time data provided by the GPS spoofer 148 to a clock at the base station 102. As another example, the lack of sophistication may result from the GPS spoofer 148 simulating data of only a subset of satellites that can transmit data to a given location instead of the entire set of satellites that can transmit data to the given location. The lack of sophistication of the GPS spoofer 148 may allow another device (e.g., the base station 102 or the BSC 110) to determine that the data transmitted from the GPS spoofer 148 comprises spoofed GPS data.

The base station 102 can transmit a set of data to the BSC 110 via the communication link 106. The transmitted data may comprise GPS data received via GPS signals 136, 138, 140, 142, GPS data received via a GPS signal repeater, and/or spoofed GPS data received via the data signal 150. The BSC 110 can receive the transmitted data and thereafter make various determinations, such as (i) a determination of whether the transmitted data comprises spoofed GPS data, (ii) a determination of a location of base station 102, and (iii) if the transmitted data comprises spoofed GPS data, a determination of an alleged location of the base station 102.

The BSC 110 controls one or more base stations, such as the base stations 102, 128. The BSC 110 may control the base stations by, for example, allocating radio channels to each of the base stations, controlling handover of a data session from one base station to another base station, preventing a base station from performing the particular base station function (s), and allowing a base station to perform the particular base station function(s).

The BSC 110 is connected to a mobile switching center (MSC) 154. The MSC 154 is a switch that provides connectivity between the BSC 110 and a public switched telephone network (PSTN) 130. The PSTN 130 may be connected to a plurality of communication devices, one of which may be a landline phone 132. The connectivity provided by the MSC 154 to the PSTN 130 allows a communication session to be established and carried out between two or more communication devices. For example, the connectivity provided by the MSC 154 can allow a communication session (e.g., a voice call) to be carried out between the wireless communication device 124 and the landline phone 132.

The MSC 154 may connect to and/or include a home location register (HLR) database 156 that maintains details associated with each wireless communication device that is allowed to use the RAN 162. The particular base station function(s) carried out by the base station 102 may include a function comprising sending to the BSC 110 a message that causes the BSC 110 to send to the HLR database 156 a message for updating information associated with a wireless communication device, such as an updated location of wireless communication device 124.

Similarly, the MSC 154 may connect to and/or include a visitor location register (VLR) database 158. The VLR database 158 maintains a list of subscribers that have roamed into a cell or cell sector that the BSC 110 serves. The particular base station function(s) carried out by the base station 102 may include a function comprising sending to the BSC 110 a message that causes the BSC 110 to send to the VLR database 158 a message for updating information associated with a wireless communication device, such as the updated location of wireless communication device 124.

The BSC 110 may provide connectivity to an internet protocol (IP) network 108 via a gateway 104 so as to allow the wireless communication device 124 to establish and/or maintain a data session with a remote entity 160 that interfaces to the IP network 108. The IP network 108 may comprise the Internet, and the gateway 104 may comprise a packet data serving node (PDSN) or another type of gateway. As an example, the data session may comprise a point-to-point protocol (PPP) data session, a virtual private network (VPN) data session, or another type of data session.

The communication links 106, 164 may each comprise one or more wireless communication links, one or more landline communication links, or a combination of wireless and landline communication links interconnected via appropriate interfaces and/or various communication network elements (e.g., modems, routers, and switches). The communication links 106, 164 may comprise a portion of the IP network 108.

The wireless communication link(s) may comprise communication network elements, such as (i) an antenna and transmitter circuitry for transmitting communication signals via an air interface according to an air interface protocol, such as any of the air interface protocol listed herein, and (ii) an antenna and receiver circuitry for receiving the transmitted communication signals.

The landline communication link(s) may comprise any of a variety of conductors, such as coaxial cable, category 5 (Cat 5) cable, optical fiber, powerline conductors, or another type of conductor. The powerline conductors may carry out communications according to a broadband over powerline standard, such as IEEE P1901 Draft Standard for Broadband over Power Line Networks: Medium Access Control and Physical Layer Specifications.

Wireless communication devices 124, 126, as well as any other wireless communication devices that communicate with the base station 102 and/or the base station 128, may comprise any of a variety of wireless communication devices, such as a cellular phone, a personal digital assistant (PDA), a laptop computer including a wireless interface card for communicating via an air interface (e.g., air interface 144), or another type of wireless communication device.

The base station 128 may carry out communications with one or more wireless communication devices via an air interface, such as communications carried out with a wireless communication device 126 via an air interface 146. The air interface 146 may carry out communications according to the air interface protocol used by air interface 144 or according to another air interface protocol.

Figure 2:
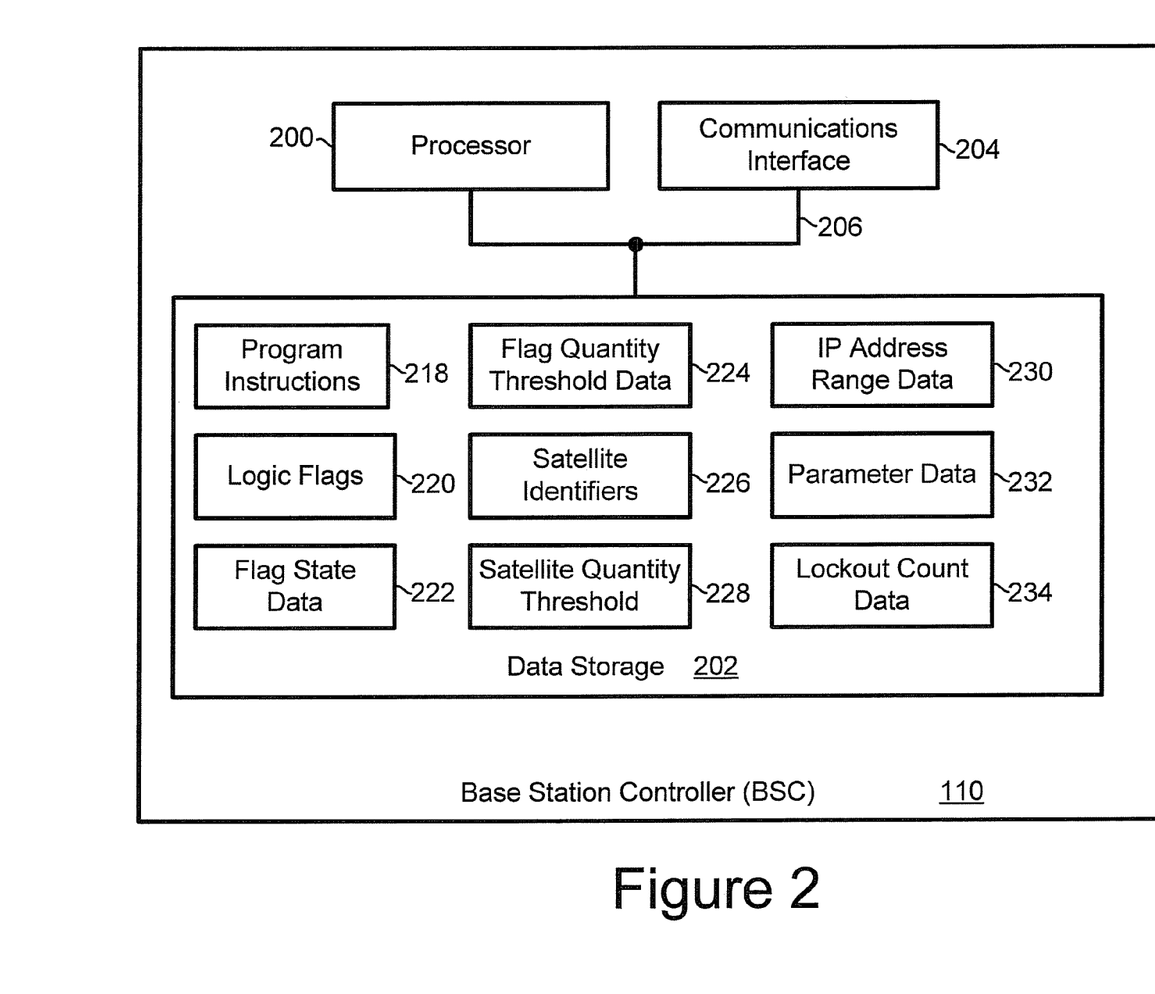
FIG. 2 is a block diagram of an exemplary base station controller.

Next, FIG. 2 depicts details of the BSC 110. As shown in FIG. 2, the BSC 110 comprises a processor 200, data storage 202, and a communications interface 204, all of which may be linked together via a system bus, network, or other connection mechanism 206. The "remote apparatus" referred to hereinabove may be arranged to include at least some of the elements of BSC 110.

The processor 200 may comprise one or more general purpose processors (e.g., INTEL microprocessors) and/or one or more special purpose processors (e.g., digital signal processors). The processor 200 executes computer-readable program instructions stored in the data storage 202.

The data storage 202 maintains data for the BSC 110 and comprises a computer-readable storage medium readable by the processor 200. The computer-readable storage medium may comprise volatile and/or non-volatile storage components, such as optical, magnetic, organic or other memory or disc storage, which can be integrated in whole or in part with the processor 200. Alternatively, the entire computer-readable storage medium may be remote from the processor 200 and the processor 200 may communicate with the remote computer-readable storage medium via the connection mechanism 206.

The data storage 202 may contain a variety of data. For purposes of this description, at least a portion of the data contained in the data storage 202 is associated with the base station 102. A person of ordinary skill in the art will understand that other data similar to the data associated with the base station 102 may be associated with another base station and stored in the data storage 202.

The data contained in the data storage 202 may include computer-readable program instructions 218 that are executable by the processor 200. Execution of the program instructions 218 may cause the processor 200 to make the base station operability determination based, at least in part, on one or more other determinations that are made by the processor 200 and/or the base station 102.

As an example, the one or more other determinations may include: (i) determining whether a set of data, received at the BSC 110 from the base station 102, comprises spoofed GPS data, (ii) determining whether satellite identifiers included in the received set of data match satellite identifiers of the GPS system, and (iii) determining a location of the base station 102 and determining whether the satellite identifiers of the received set of data should be receivable at the determined base station location at a time identified in the set of data. If the satellite identifiers should not be receivable at the base station location at the identified time, then the processor 200 may use this determination as an indication that the received set of data comprises spoofed GPS data.

Data storage 204 may also contain data such as logic flags 220, flag state data 222, flag quantity threshold data 224, satellite identifiers 226, satellite quantity threshold data 228, IP address range data 230, parameter data 232, and lockout count data 232.

The logic flags 220 comprise logic flags settable to a given state based on the processor 200 making, for each logic flag, a respective determination regarding at least a portion of the data received from the base station 102. For purposes of this description, the given state indicates a state in which the base station 102 is not allowed to carry out the particular base station function(s), and another state (hereinafter the "other state") indicates a state in which the base station 102 is allowed to carry out the particular base station function(s). A person of ordinary skill in the art will understand however that the logic flags 220 are settable to other states, such as true or false.

The logic flags 220 may comprise a plurality of flags, such as (i) a first logic flag that is settable to the given state in response to the BSC 110 determining that the data received from the base station 102 comprises spoofed GPS data, (ii) a second logic flag that is settable to the given state in response to the BSC 110 determining that the data received at a GPS receiver 300 (shown in FIG. 3) is from a quantity of GPS satellites less than or equal to the satellite quantity threshold 228, (iii) a third logic flag that is settable to the given state in response to the BSC 110 determining that a clock 312 (shown in FIG. 3) has drifted at least a threshold amount of time a threshold number of times, and (iv) a fourth logic flag that is settable to the given state in response to the BSC 110 determining that an IP address associated with the base station 102 is not within a particular IP address range 230. Other examples of the logic flags 220 are also possible.

Figure 3:
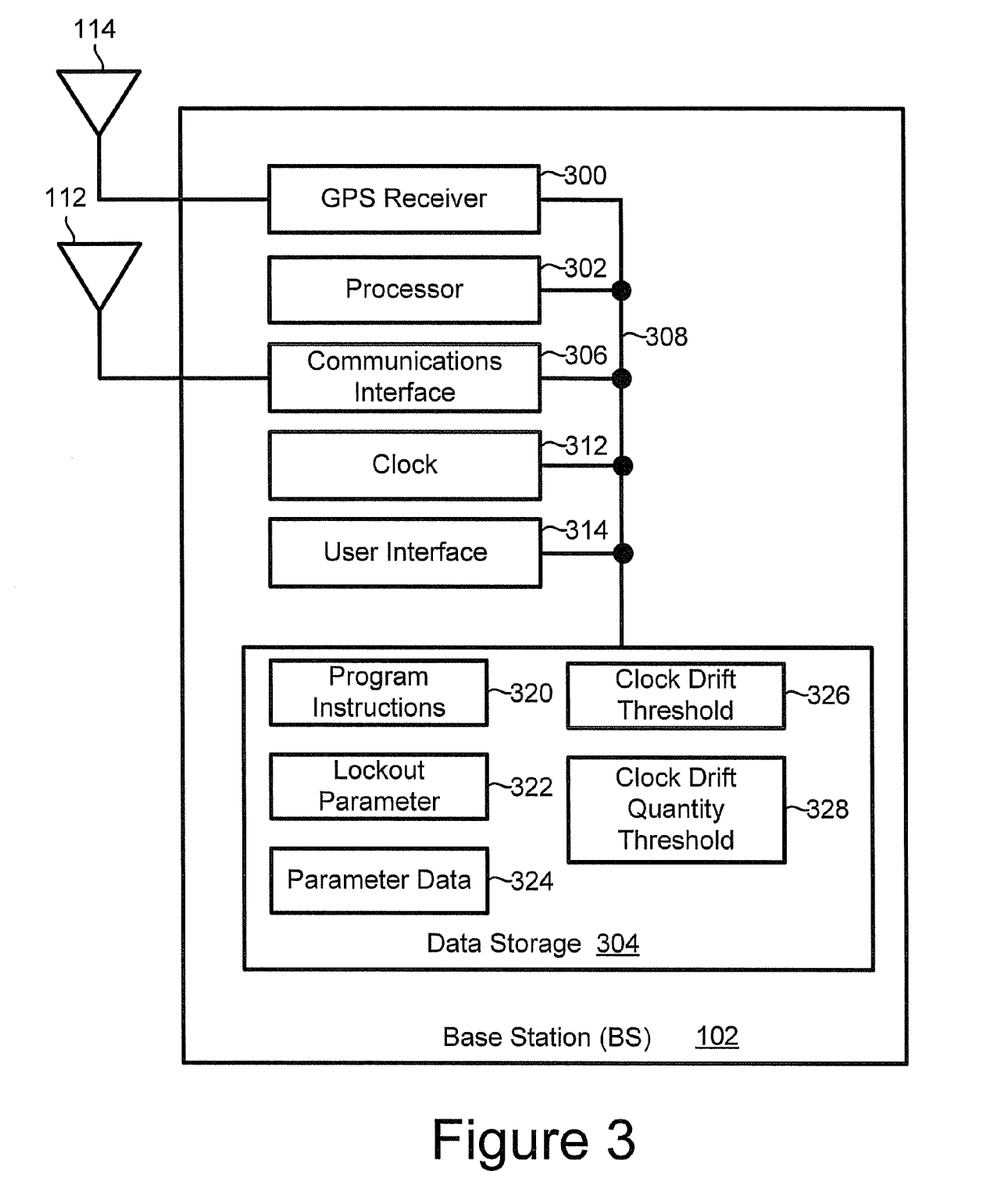
FIG. 3 is a block diagram of an exemplary base station.

With respect to the third logic flag, the BSC 110 may make the determination (that the clock 312 has drifted at least a threshold amount of time a threshold number of times) in response to receiving from the base station 102 clock data that indicates whether the clock 312 has drifted at least the threshold amount of time 222 a threshold number of times.

The flag state data 222 comprises data that indicates how many of the logic flags associated with the base station 102 are set to the given state. For example, the flag state data 222 may comprise data that indicates that zero logic flags associated with the base station 102 are set to the given state. As the logic flags associated with base station 102 change states, the flag state data 222 associated with base station 102 changes if the quantity of logic flags sets to the given state changes.

The flag quantity threshold data 224 comprises data that indicates how many logic flags (associated with the base station 102) of the logic flags 220 must be set to the given state so as to indicate that the base station 102 should not be allowed to carry out the particular base station function(s).

In accordance with an exemplary embodiment, if the flag state data 222 associated with the base station 102 is greater than or equal to the flag quantity threshold data 224, then the processor 200 may determine that the base station 102 is not allowed to carry out the particular base station function(s). Otherwise, if the flag state data 222 associated with the base station 102 is less than the flag quantity threshold data 224, then the processor 200 may determine that the base station 102 is allowed to carry out the particular base station function(s).

The satellite identifier data 226 comprises data that indicates how many and which satellites identifiers are included in the data received at the BSC 110 from the base station 102. The satellite identifier data 226 may include a unique pseudo random noise (PRN) code that is associated with a respective satellite of the GPS system. The satellite identifier data 226 may comprise GPS data received at various times throughout a given day or days. Table 1 depicts exemplary satellite identifier data 226 including base station identifiers, date, time (in universal time coordinated (UTC)), and satellite identifiers. The BSC 110 receives the data shown in each row of Table 1 at substantially the same time indicated in that row.

For purposes of this description, base station 102 is associated with a base station identifier "1" and base station 128 is associated with a base station identifier "2." Additionally, for purposes of this description, the satellites 116, 118, 120, 122 are associated with satellite identifiers 1, 2, 3, 4, respectively, and other satellites of the GPS system are associated with satellite identifiers 5, 6, 7, 8, 9, 10, 11, 12, 13, 14.

TABLE 1

Satellite Identifier Data

| Base Station Identifier | Date | Time | Satellite Identifiers |
|---|---|---|---|
| 1 (BS 102) | 01JAN2009 | 400 UTC | 1, 2, 3 |
| 1 (BS 102) | 01JAN2009 | 430 UTC | 1, 2, 3, 4 |
| 1 (BS 102) | 01JAN2009 | 500 UTC | 2, 3, 4 |
| 1 (BS 102) | 01JAN2009 | 1200 UTC | 5, 6, 7, 8, 9 |
| 1 (BS 102) | 01JAN2009 | 1600 UTC | 10, 11, 12, 13, 14 |
| 2 (BS 128) | 01JAN2009 | 400 UTC | 1, 2, 3, 4 |
| 2 (BS 128) | 01JAN2009 | 430 UTC | 1, 2, 3, 4 |
| 2 (BS 128) | 01JAN2009 | 500 UTC | 1, 2, 3, 4 |
| 2 (BS 128) | 01JAN2009 | 1200 UTC | 1, 2, 3, 4 |
| 2 (BS 128) | 01JAN2009 | 1600 UTC | 1, 2, 3, 4 |

As shown in Table 1, the satellite identifiers received in sets of data from the base station 102 (i.e., the base station having an ID of "1") are different at various times (i.e., 400 UTC, 430 UTC, 500 UTC, 1200 UTC, and 1600 UTC) on Jan. 1, 2009, whereas, the satellite identifier received in sets of data from the base station 128 (i.e., the base station having an ID of "2") are the same at the various times on Jan. 1, 2009.

A determination of whether the data received from the base station 102 comprises spoofed GPS data may be based, at least in part, on (i) making a determination of whether the satellite identifiers of the received data remain constant over a given period of time (e.g., a period of time from 400 UTC to 1600 UTC on Jan. 1, 2009), and (ii) making a determination of whether a power source was continuously connected to the base station 102 throughout the given period of time. The given period of time is selected based on the amount of time required for a GPS receiver at a given location to be able to receive GPS signals from two sets of GPS satellites where at least one GPS satellite is not contained within both sets of GPS satellites.

If the power source is continuously connected to the base station 102 and if the satellite identifiers of the received GPS data remain constant over the given period of time, then the determination indicates that the received GPS data may comprise spoofed GPS data. However, if the power source is continuously connected to the base station 102 and if the satellite identifiers of the received GPS data change over the given period of time, then the determination indicates that the received GPS data may not comprise spoofed GPS data.

Another determination useable in determining whether the data received from the base station 102 comprises spoofed GPS data may be based, at least in part, on making a determination whether satellite identifiers received in a given set of data (e.g., the satellite identifiers of the second row of Table 1) identify satellites whose transmitted data can be received at a location determined from given set of data at a time substantially near a time disclosed in the given set of data.

For example, if the given set of data comprises data that (i) can be used to determine a location in Overland Park, Kans., (ii) includes time information indicating a time of 1200 UTC, and (iii) the set of identifier shown in the fifth row of Table 1, then the BSC 110 can determine whether data transmitted directly from the satellites identified by the set of identifier shown in the fifth row of Table 1 can be received at the location in Overland Park, Kans. at 1200 UTC. If the data can be received directly from the identified satellites at the location in Overland Park, Kans. at 1200 UTC, then the received GPS data may not include spoofed GPS data. However, if the data cannot possibly be received directly from the identified satellites at the location in Overland Park, Kans. at 1200 UTC, then the received GPS data may include spoofed GPS data.

The satellite quantity threshold data 228 comprises data that indicates a threshold number of satellites. The processor 200 can execute program instructions to determine whether a set of data received from the base station 102 comprises data from a quantity of satellites that is less than or equal to the satellite quantity threshold data 228, and if so, cause the second logic flag to be set to the given state. Otherwise, if received set of data comprises data from a quantity of satellites that exceeds the satellite quantity threshold data 228, then the second logic flag can be set to the other state.

The IP address range data 230 may comprise a range of IP addresses that is associated with and/or identifiable with particular locations and/or areas. As an example, the IP address range data 230 may comprise a range of IP addresses associated with a particular country, e.g., the United States and/or with a coverage area provided by a wireless service provider. The IP address range data 230 may include consecutive IP addresses, non-consecutive IP addresses, or consecutive and non-consecutive IP addresses.

The base station 102 may provide to the BSC 110 a set of data including a source IP address associated with the base station 102 and/or the set of data. The processor 200 may execute program instructions to determine whether the source IP address is within the range of IP addresses of data 230. In accordance with the exemplary IP address range comprising IP addresses associated with the United States, if the processor 230 determines that the source IP address is within the IP address range, then the processor 230 can determine that the base station 102 is located within the United States, whereas if the processor 230 determines that the source IP address is not within the range of IP addresses of data 230, then the processor 230 can determine that the base station 102 is not within the United States.

If a wireless service provider that operates the RAN 162 is licensed to provide wireless service in a given country, e.g., the United States, and if the BSC 110 determines that the base station 102 is not within the United States, the BSC 110 may execute program instructions so as to prevent the base station 102 from carrying out the particular base station function(s).

The parameter data 232 comprises data that indicates whether one or more base stations is allowed to carry out the particular base station function(s). Table 2 depicts exemplary parameter data 232 for the base stations 102, 128. As shown in Table 2, base station 102 is allowed to carry out the particular base station function(s), whereas base station 128 is not allowed to carry out the particular base station function (s). The processor 200 may execute program instructions that cause the parameter data 232 to be modified in response to the processor 200 making the base station operability determination.

TABLE 2

| Parameter Data | |
| --- | --- |
| Base Station | Carry out the particular Base Station Function |
| 102 | Allow |
| 128 | Disallow |

The lockout count data 234 comprises data that indicates how many times the flag state data 222 associated with the base station 102 equals or exceeds the flag quantity threshold data 224. If lockout count data associated with the base station 102 equals or exceeds a threshold number of times, the communications interface 204 may send to the base station 102 a message that causes the base station 102 to set a lockout parameter 322 (shown in FIG. 3) so as to prevent the base station 102 from carrying out the particular base station function(s). The flag quantity threshold data may be set to zero after the base station operability determination indicates that the base station 102 is allowed to carry out the particular base station function(s).

In accordance with an exemplary embodiment, the lockout parameter 322 differs from the parameter data 232 in that the lockout parameter 322 may only be reset (to a state that allows the base station 102 to carry out the particular base station function(s)) in response to the base station 102 receiving a service message, whereas the parameter data 232 may be reset in response to a user cycling power at the base station 102, the BSC 110 receiving another set of data from the base station 102, and the BSC 110 making a determination that the base station 102 is allowed to carry out the particular base station function(s). In one respect, the base station 102 may have to be connected to a service tool at a service facility remote from the indoor premises 138 in order to receive the service message. In another respect, base station 102 may receive the service message via the communication link 106.

The communications interface 204 may interface with any of a variety of communication links, such as wireless and/or landline communication links. As an example, the communications interface 204 may interface with a landline communication link that connects to the MSC 154. As another example, the communications interface 204 may interface with communication links 106, 164 so as to carry out communications with the base stations 102, 128, respectively. In accordance with this latter example, the communications interface 204 may comprise a network interface card (NIC) and/or a modem for carrying out communications according to a Transmission Control Protocol/Internet Protocol (TCP/IP).

The communications interface 204 may receive one or more sets of data from the base station 102. The data storage 202 may store the received set(s) of data and, thereafter, the processor 200 may execute program instructions so as to make the various determinations so as to determine whether the base station 102 is allowed to carry out the particular base station function(s).

Next, FIG. 3 depicts details of the base station 102. As shown in FIG. 3, the base station 102 comprises a GPS receiver 300, a processor 302, data storage 304, a communications interface 306, a clock 312, and a user interface 314, all of which may be linked together via a system bus, network, or other connection mechanism 308. The "device" referred to hereinabove may be arranged to include at least some of the elements of base station 102. The base station 128 and/or one or more other base stations may be arranged similar to base station 102 so as to carry out similar functions as the base station 102.

The GPS receiver 300 may be arranged in various configurations so as to (i) receive GPS input data indicative of a location of the GPS receiver 300 (i.e., the location of the base station 102), and (ii) transmit GPS output data indicative of the location of the GPS receiver 300. The GPS output data may be transmitted to the processor 302, the data storage 304, and/or to the communications interface 306 for transmission, in turn, to the BSC 110.

The GPS input data may include satellite identifier data, time-of-day data, GPS week number data, satellite health data, ephemeris data, almanac data, and/or other data. The GPS input data may be received from one or more GPS satellites (e.g., GPS satellites 116, 118, 120, 122), a GPS signal repeater, and/or from the GPS spoofer 148.

The GPS output data may be identical to the GPS input data. Alternatively, the GPS output data may differ from the GPS input data. For example, in addition to the GPS input data, the GPS output data may include data that indicates a location of the base station 102, as determined by the GPS receiver 300.

The processor 302 may comprise one or more general purpose processors and/or one or more special purpose processors. The processor 302 may execute computer-readable program instructions stored at the data storage 304.

The data storage 304 comprises a computer-readable storage medium readable by the processor 302. The data storage 304 may contain a variety of data, such as program instructions 320, a lockout parameter 322, parameter data 324 settable to the given state or to the other state, a clock drift threshold 326, and a clock drift quantity threshold 328.

In particular, the program instructions 320 may comprise instructions that (i) cause the processor 302 to make a first determination of whether the data received at the GPS receiver 300 comprises spoofed GPS data, (ii) cause the processor 302 to make a base station operability determination, based at least in part on the first determination, (iii) cause the data storage 304 to set at least one parameter of the parameter data 324 to the given state or to the other state based on the second determination and/or in response to the base station 102 receiving from the BSC 110 data that indicates the base station 102 is not allowed to carry out the particular base station function(s).

The program instructions 320 may also include (i) instructions to maintain the clock 312, (ii) instructions to determine whether the clock 312 has drifted an amount of time that equals or exceeds the clock drift threshold 326 a number of times that equals or exceeds the clock drift quantity threshold 328, and (iii) any of the instructions described herein as being executable by the processors 200, 302.

Additionally, the data storage 304 may contain some or all of the data identified herein as being contained in the data storage 202. For example, the data storage 304 may contain the logic flags 220 that are associated with the base station 102 and/or the IP address range data 230. In this way, the data storage 304 contains other data for use in making the various determinations as to whether the base station 102 is allowed to carry out the particular base station function(s).

The communications interface 306 may be arranged to interface with any of a variety of communication links, such as wireless and/or landline communication links. As an example, the communications interface 306 interfaces to the antenna 112 so as to allow the base station 102 to carry out communications with one or more wireless communication devices (e.g. wireless communication device 124) via the air interface 144. As another example, the communications interface 306 interfaces to the communication link 106 so as allow the base station 102 to carry out communications with the BSC 110.

The communications interface 306 may engage in a variety of communications. As an example, the communications interface 306 may transmit data to the BSC 110. The data transmitted to the BSC may include output data of the GPS receiver 300 and/or data received from the one or more wireless communication devices (e.g., wireless communication device 124). As another example, the communications interface 306 may receive from the BSC 110 data that indicates whether the base station 102 is allowed to carry out the particular base station function(s) and/or data destined for the one or more wireless communication devices.

The clock 312 may comprise a software clock for keeping the time of day. The processor 302 may execute program instructions arranged to carry out the functions of a software clock. Additionally or alternatively, the clock 312 may comprise a hardware clock for keeping the time of day. The hardware clock may be powered by a long-life battery that allows the clock to be powered on regardless of whether the processor 302 is powered on.

A time maintained by the clock 312 may be compared to the time information received at the GPS receiver 300 so as to determine whether the time maintained by the clock 312 has drifted an amount of time equaling or exceeding the clock drift threshold 326. As an example, the clock drift threshold 326 may be 0.1 seconds or an amount of time greater than or less than 0.1 seconds. The data storage 304 may maintain data that indicates how many times the clock 312 drifts over a given period of time (e.g., 24 hours) and compare this data to the clock drift quantity threshold 328, which may equal 3 or some number greater than or less than 3.

The processor 302 may create clock data that indicates whether the clock 312 has drifted at least the threshold amount of time a number of times that equals or exceeds the clock drift quantity threshold 328. The processor 302 may use the clock data to determine whether the base station 102 is allowed to carry out the particular base station function(s). Additionally or alternatively, the clock data may be transmitted to the BSC 110 so that the processor 200 can use the clock data to determine whether the base station 102 is allowed to carry out the particular base station function(s).

The clock 312 may be arranged to be synchronized with the time information received at the GPS receiver 300. The synchronization may occur in response to various events, such as the GPS receiver 300 receiving the time information or the processor 302 determining that the clock 312 has drifted an amount of time equaling or exceeding the clock drift threshold 328. Since the GPS spoofer 148 will typically include a clock that is less precise than clocks used by satellites of the GPS system, the time information provided by the GPS spoofer 148 will tend to drift by a larger amount of time than the time information provided by the GPS system. This tendency to drift may be used as a basis to determine that when a time kept by the clock 312 drifts by an amount of time equal to or exceeding the clock drift threshold 326, the GPS receiver 300 has received spoofed GPS data.

The user interface 314 may be arranged in various configurations. In accordance with an exemplary embodiment of the invention, the user interface 314 may be arranged to include a display (e.g., a liquid crystal display) and/or a light emitting diode (LED). As an example, the display and/or LED may be used to indicate that (i) the base station 102 can carry out the particular base station function(s), (ii) the base station 102 cannot carry out the particular base station function(s), and/or (iii) power to the base station 102 should by cycled off then back on. Other examples of indications that can be provided by the user interface 314 are also possible.

3. Exemplary Operation

Figure 4:
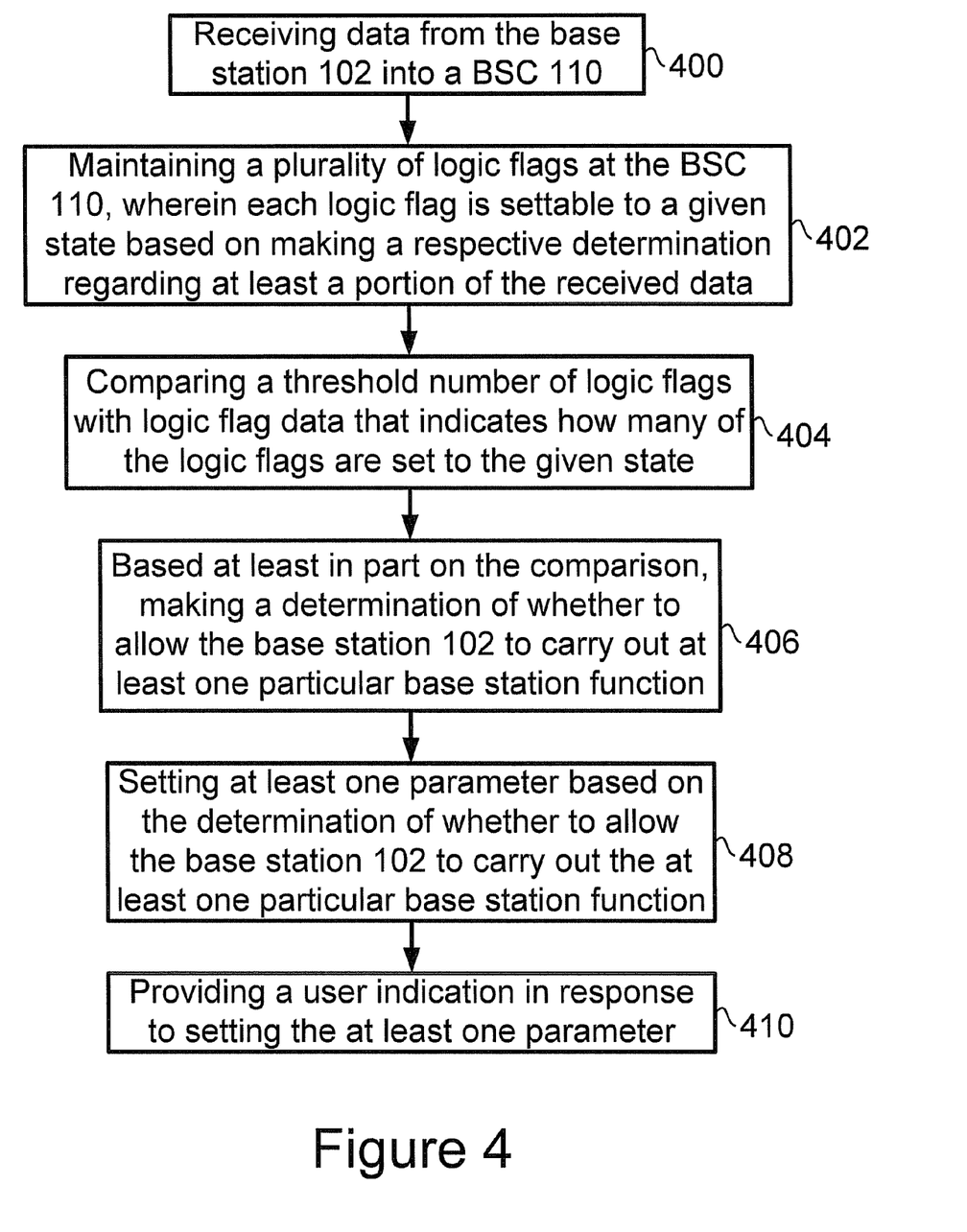
FIG. 4 is a flow chart depicting a set of functions that may be carried out in accordance with an exemplary embodiment of the present invention.

FIG. 4 is a flow chart provided to illustrate a set of functions that may be carried out in accordance with an exemplary embodiment of the present invention. As shown in FIG. 4, block 400 includes receiving data from the base station 102 into the BSC 110. The BSC 110 may receive various types of data from the base station 102, such as (i) data that is received at the GPS receiver 300, (ii) data that indicates an IP source address associated with the base station 102, (iii) the clock data that indicates whether the clock 312 has drifted at least a threshold amount of time a threshold number of times, and (iv) any of the data storable at the data storage 304.

The data received at the BSC 110 may be received via the communication link 106. The BSC 110 may receive the data in response to sending the base station 102 a request to transmit the data to the BSC 110. Additionally or alternatively, the BSC 110 may receive the data in response to the base station 102 executing program instructions that cause the data to be transmitted to the BSC 110. For example, the processor 302 may execute program instructions (to transmit the data) in response to (i) detecting that the base station 102 has been connected to a power source, (ii) detecting a location of the base station 102, and/or (iii) receiving data at the GPS receiver 300.

The BSC 110 may receive the data by receiving one or more messages transmitted from the base station 102. In the case in which the receiving the data comprises receiving more than one message, the base station 102 may transmit the messages at substantially the same time or the base station 102 may send a first message and then, after a significant amount of time has passed, the base station may send a second message.

For example, after the base station 102 powers on, the base station 102 may send to the BSC 110 a first message comprising a source IP address associated with the base station 102, and after the base station 102 detects its location (e.g., ninety seconds after transmission of the first message), the base station 102 may send a second message comprising the source IP address and data received at the GPS receiver 300.

Next, block 402 includes maintaining the logic flags 220 at the BSC 110. The logic flags 220 may comprise logic flags associated with one or more base stations. Maintaining the logic flags 220 may include changing at least one of the logic flags from the given state to the other state or from the other state to the given state. The logic flags may be set to the given state or the other state in response to the processor 202 executing program instructions to make various determinations as to whether the logic flags should be set to the given state. Maintaining the logic flags 220 may also comprise the processor 202 executing program instructions to determine, for each of the one or more base stations, how many of the logic flags associated with each logic flag are set to the given state. The processor 202 may also execute program instructions to store flag state data 222 that indicates the quantity of logic flags that are set to the given state for each of the one or more base stations.

Next, block 404 includes comparing the flag quantity threshold data 224 with the flag state data 222. This comparison may be made by the processor 202 executing program instructions 218. For purposes of this description, these program instructions will be referred to hereinafter as the "comparison instructions." The processor 202 may execute the comparison instructions in response to various events, such as expiration of a timer, receiving data that indicates one or more of the logic flags 220 has changed to the given state, and receiving data that indicates one or more of the logic flags 220 have changed from the given state to the other state.

Next, block 406 includes based at least in part on the comparison, making a determination of whether to allow the base station 102 to carry out particular base station function(s). As an example, if the flag state data 222 associated with the base station 102 exceeds the flag quantity threshold data 224, the determination may indicate that the base station 102 is not allowed to carry out the particular base station function(s). As another example, if the flag state data 222 associated with the base station 102 is less than the flag quantity threshold data 224, the determination may indicate that the base station 102 is allowed to carry out the particular base station function(s). If the flag state data 222 equals the flag quantity threshold data 224, the base station 102 may be allowed to carry out the base station function or the base station may be prevented from carrying out the base station function.

Next, block 408 includes setting at least one parameter based on the determination of whether to allow the base station 102 to carry out the particular base station function(s). Setting the at least parameter may include setting at least one parameter of the parameter data 232. In this regard, the processor 302 may execute program instructions that cause the communications interface 306 to send to the BSC 110 a request to set the at least one parameter of the parameter data 232 in accordance with the determination of block 406.

Additionally or alternatively, setting the at least one parameter may include setting at least parameter of the parameter data 324 and/or setting the lockout parameter 322. In this regard, the processor 302 may execute program instructions that cause the at least parameter of the parameter data 324 and/or the lockout parameter 322 to be set in accordance with the determination of block 406.

In a situation in which the at least one parameter is set to a value(s) to allow the base station 102 to carry out the particular base station function(s), the base station 102 and/or the BSC 110 may execute program instructions to allow the base station 102 to carry out the particular base station function(s).

In a situation in which the at least one parameter is set to a value(s) to prevent the base station 102 from carrying out the particular base station function(s), the base station 102 and/or the BSC 110 may execute program instructions to prevent the base station 102 from carrying out the particular base station function(s).

Next, block 410 includes providing a user indication in response to setting the at least one parameter. The processor 302 may execute program instructions so as to cause the user interface 314 to provide the user indication. The user indication may indicate a variety of information. For example, the user indication may indicate that power provided to the base station 102 should be cycled (e.g., the power should be turned off then back on). Cycling the power may cause the GPS receiver 300 to carry out an initialization process that causes the GPS receiver 300 to determine the location of the base station 102 based on data received during and/or after the initialization process. Cycling the power may also cause the base station 102 to make another base station operability determination or to cause the base station 102 to send data to the BSC 110 such that the BSC 110 makes another base station operability determination.

As another example, the user indication may indicate that the base station 102 can carry out the particular base station function(s). The processor 302 may execute program instructions to present this user indication in response to the processor 302 setting at least one parameter of the parameter data 324 so as to allow the base station 102 to carry out the particular base station function(s).

As yet another example, the user indication may indicate that the base station 102 cannot carry out the particular base station function(s). The processor 302 may execute program instructions to present this user indication in response to the processor 302 setting the at least one parameter of the parameter data 324 or the lockout parameter 322 so as to prevent the base station 102 from carrying out the particular base station function(s).

As still yet another example, the user indication may indicate that the base station 102 should be taken to a service facility so that the lockout parameter 322 may be reset so as to allow the base station to carry out the particular base station functions. The processor 302 may execute program instructions to present this user indication in response to the lockout parameter 322 being set to prevent the base station 102 from carrying out the particular base station function(s).

4. Conclusion

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. A method comprising:
   receiving into a base station controller from a base station, a first set of data;
   at the base station controller, making a first determination of whether the first set of data comprises spoofed global positioning system (GPS) data; and
   making a second determination of whether to allow the base station to carry out at least one particular base station function, wherein the making the second determination is based at least in part on the first determination.

2. The method of claim 1, wherein a global positioning system comprises a plurality of satellites, wherein each satellite of the plurality of satellites is associated with a respective satellite identifier, and wherein the first set of data comprises one or more satellite identifiers, the method further comprising:
   at the base station controller, making a third determination of whether each of the one or more satellite identifiers of the first set of data matches a respective satellite identifier of a satellite of the global positioning system,
   wherein making the second determination is further based on the third determination.

3. The method of claim 2, wherein each satellite identifier associated with a satellite of the global positioning system comprises a unique pseudo random noise (PRN) code.

4. The method of claim 2, further comprising:
   receiving into the base station controller from the base station a second set of data comprising one or more satellite identifiers, wherein the base station controller receives the second set of data prior to receiving the first set of data, wherein the base station controller receives the second set of data when a clock indicates a first clock time and the base station controller receives the first set of data when the clock indicates a second clock time, wherein an amount of time between the first clock time and the second clock time is greater than or equal to a threshold amount of time, and wherein the threshold amount of time is an amount of time sufficient for a GPS receiver at a given location on Earth to receive signals from at least two different sets of GPS satellites,
   at the base station controller, making a fourth determination of whether the base station was continuously connected to a power source from at least a time when the base station sends the second set of data to the base station controller till a time when the base station sends the first set of data to the base station controller; and
   at the base station controller, making a fifth determination of whether the satellite identifiers of the first set of data differ from the satellite identifiers of the second set of data,
   wherein making the second determination is further based on the fourth determination and the fifth determination.

5. The method of claim 4, further comprising:
   at the base station controller, using the second set of data to determine a location of the base station; and
   making a sixth determination of whether the satellite identifiers of the first set of data identify satellites whose transmitted data can be received at the determined location at a time substantially near a time identified by the first set of data,
   wherein making the second determination is further based on the sixth determination.

6. The method of claim 1, wherein the base station is associated with a particular Internet Protocol (IP) address, the method further comprising:
   receiving the particular IP address into the base station controller, wherein the particular IP address accompanies the first set of data received at the base station controller; and
   at the base station controller, making a determination of whether the particular IP address is within a particular IP address range;
   wherein making the second determination is further based on the third determination.

7. The method of claim 6,
   wherein the particular IP address range comprises IP addresses for a particular country,
   wherein if the third determination indicates that the particular IP address is not within the particular IP address range or the first determination indicates that the first set of data comprises spoofed GPS data, then the second determination indicates that the base station is not allowed to carry out the at least one particular base station function,
   wherein if the third determination indicates that the particular IP address is not within the particular IP address range and the first determination indicates that the first set of data comprises spoofed GPS data, then the second determination indicates that the base station is not allowed to carry out the at least one particular base station function, and
   wherein if the third determination indicates that the particular IP address is within the particular IP address range and the first determination indicates that the first set of data does not comprise spoofed GPS data, then the second determination indicates that the base station is allowed to carry out the at least one particular base station function.

8. The method of claim 1, wherein if the first determination indicates that the first set of data does not comprise spoofed GPS data, the method further comprises:
   making a third determination of whether the first set of data comprises data from at least a threshold number of satellites of a global positioning system,
   wherein making the second determination is further based on the third determination.

9. The method of claim 1, further comprising:
   maintaining a clock at the base station;
   receiving one or more other sets of data at the base station, wherein the first set of data and each of the one or more other sets of data comprises respective time information for a given period of time, and at the base station, comparing the clock to the received time information so as to determine how many times the clock has drifted a threshold amount of time during the given period of time, and responsively creating clock data that indicates whether the clock has drifted the threshold amount of time a threshold number of times;

wherein making the second determination is further based on the clock data.

10. The method of claim 1, wherein the base station controller makes the second determination, the method further comprising:

in response to making the second determination, sending from the base station controller to the base station a message that indicates whether the base station is allowed to carry out the at least one particular base station function, and receiving the message at the base station and responsively setting at the base station at least one parameter that indicates whether the base station is allowed to carry out the at least one particular base station function.

11. The method of claim 10, wherein if the first determination indicates that the first set of data comprises spoofed GPS data, then the second determination indicates that the base station is not allowed to carry out the at least one particular base station function, and wherein if the first determination indicates that the first set of data does not comprise spoofed GPS data, then the second determination indicates that the base station is allowed to carry out the at least one particular base station function.

12. The method of claim 1, wherein the at least one particular base station function comprises a function selected from the group consisting of: (i) transmitting a forward link carrier for reception by a wireless communication device, (ii) transmitting a pilot beacon for reception by the wireless communication device, (iii) allowing a wireless communication device to establish a virtual private network (VPN) data session with a remote entity, (iv) allowing the wireless communication device to maintain a VPN data session established with a remote entity, (v) allowing the wireless communication device to establish a point-to-point protocol (PPP) data session with a remote entity, (vi) allowing the wireless communication device to establish a voice call with a remote phone, (vii) sending to the base station controller a message that causes the base station controller to send to a home location register (HLR) database a message for updating information associated with the wireless communication device, (viii) sending to the base station controller a message that causes the base station controller to send to a visitor location register (VLR) database a message for updating information associated with the wireless communication device, (ix) prompting a user of the base station to cycle power to the base station, and (ix) notifying a user of the base station that reception quality of GPS signals is below a threshold level of GPS signal reception.

13. The method of claim 1, wherein if the second determination indicates that the base station is not allowed to carry out the at least one particular base station function, the method further comprises:

at the base station, setting at least one parameter so that the base station is prevented from carrying out the at least one particular base station function, and thereafter, receiving at the base station a service message including data that indicates the at least one parameter is to be set to allow the base station to carry out the at least one particular base station function and responsively setting the at least one parameter so as to allow the base station to carry out the at least one particular base station function.

14. The method of claim 1, further comprising:

at the base station controller, maintaining a plurality of logic flags settable to a given state, wherein the plurality of logic flags comprises two or more logic flags selected from the group consisting of (i) a first logic flag, (ii) a second logic flag, (iii) a third logic flag, and (iv) a fourth logic flag, wherein making the second determination comprises comparing a threshold number of logic flags with flag state data that indicates how many logic flags of the plurality of logic flags are set to the given state, wherein the first logic flag is settable to the given state if the first determination indicates that the first set of data comprises spoofed GPS data, wherein the second flag is settable to the given state in response to the base station controller making a determination that the first set of data comprises data from less than or equal to a threshold number of satellites, wherein the third flag is settable to the given state in response to the base station controller making a determination that a clock maintained at the base station has drifted at least a threshold amount of time a threshold number of times, wherein the fourth flag is settable to the given state in response to the base station controller determining that an Internet Protocol (IP) address associated with the base station is not within a particular IP address range, wherein if the flag state data is greater than or equal to the threshold number of flags, the second determination indicates that the base station is not allowed to carry out the at least one particular base station function, and wherein if the flag state data is less than the threshold number of flags, the second determination indicates that the base station is allowed to carry out the at least one particular base station function.

15. The method of claim 14, further comprising:

at the base station controller, based on data received from the base station, maintaining lock-out count data that indicates a number of times that the base station controller has determined that the flag state data is greater than or equal to the threshold number of flags, and if the lock-out count data exceeds a threshold number of times the base station controller has determined that the flag state data is greater than or equal to the threshold number of flags, sending to the base station from the base station controller, a message that causes the base station to set at least one other parameter to prevent the base station from carrying out the at least one particular base station function, wherein the base station is prevented from carrying out the at least one particular base station function at least until the at least one other parameter is reset in response to receiving a service message that indicates to reset the at least one other parameter, and wherein the data received from the base station includes the first set of data.

16. A system comprising:

a communications interface that receives a first set of data from a remote device;

a processor; and data storage containing computer-readable program instructions executable by the processor, wherein the program instructions comprise instructions that cause the processor to (i) make a first determination of whether the first set of data comprises spoofed global positioning system (GPS) data, and (ii) make a second determination of whether to allow the remote device to carry out at least one particular function, wherein the second determination is based at least in part on the first determination, wherein the data storage further comprises (i) a plurality of logic flags settable to a given state, (ii) flag state data that indicates how many logic flags of the plurality of logic flags are set to the given state, (iii) data that indicates a threshold number of logic flags, and (iv) data that indicates a threshold number of satellites, wherein the plurality of logic flags comprises two or more logic flags selected from the group consisting of (i) a first logic flag, (ii) a second logic flag, (iii) a third logic flag, and (iv) a fourth logic flag, wherein the first logic flag is settable to the given state if the first determination indicates that the first set of data comprises spoofed GPS data, wherein the second logic flag is settable to the given state in response to the processor making a determination that the first set of data comprises data from less than or equal to the threshold number of satellites, wherein the third logic flag is settable to the given state in response to the processor receiving a message including clock data that indicates a clock maintained at the remote device has drifted beyond a threshold amount of time for a threshold number of times, wherein the fourth logic flag is settable to the given state in response to the processor determining that an Internet Protocol (IP) address associated with the remote device is not within the particular IP address range, wherein the program instructions to make the second determination comprise instructions to compare the threshold number of logic flags with the flag state data, wherein if the flag state data is greater than or equal to the threshold number of flags, the second determination indicates that the remote device is not allowed to carry out the at least one particular function, and wherein if the quantity of logic flags is less than the threshold number of flags, the second determination indicates that the remote device is allowed to carry out the at least one particular function.

17. The system of claim 16, wherein the remote device is associated with a particular Internet Protocol (IP) address, wherein the particular IP address accompanies the first set of data received at the communications interface, wherein the program instructions further comprise instructions that cause the processor to make a third determination of whether the particular IP address is within a particular IP address range, and wherein the second determination is further based on the third determination.

18. A system comprising:

a communications interface that receives a first set of data from a remote device;

a processor; and data storage containing computer-readable program instructions executable by the processor, wherein the program instructions comprise instructions that cause the processor to (i) make a first determination of whether the first set of data comprises spoofed global positioning system (GPS) data, and (ii) make a second determination of whether to allow the remote device to carry out at least one particular function, wherein the second determination is based at least in part on the first determination, wherein the remote device comprises a base station, wherein the remote device comprises a base station function, and wherein the communications interface, the processor, and the data storage are all located within a base station controller that controls the base station.

19. A device comprising:

a global positioning system (GPS) receiver to receive a first set of data;

a communications interface to (i) transmit the first set of data to a remote apparatus that makes a first determination of whether the first set of data comprises spoofed GPS data, and (ii) receive from the remote apparatus a message including data that indicates whether the device is allowed to carry out at least one particular function, wherein the remote apparatus uses the first determination to make a second determination of whether the device is allowed to carry out the at least one particular function;

a processor; and data storage containing (i) at least one parameter settable to indicate whether the device is allowed to carry out the at least one particular function, and (ii) computer-readable program instructions executable by the processor, wherein the program instructions include instructions to set the at least one parameter in accordance with the received data that indicates whether the device is allowed to carry out the at least one particular function, wherein the data storage further contains data that indicates a time threshold and a data that indicates a quantity threshold, wherein the program instructions further comprise instructions to (i) maintain a clock at the device, (ii) determine that the clock has drifted an amount of time that equals or exceeds the time threshold a number of times that equals or exceeds the quantity threshold, and (iii) cause the communications interface to send to the remote apparatus clock data that indicates the clock has drifted an amount of time that equals or exceeds the time threshold a number of times that equals or exceeds the quantity threshold, and wherein the remote apparatus uses the clock data in addition to the first determination to make the second determination.

20. The device of claim 19, wherein device comprises a base station, wherein the at least one particular function comprises a base station function, and wherein the remote apparatus comprises a base station controller that controls the base station.

* * * * *